United States Patent [19]

Tsuda et al.

[11] 4,332,867
[45] Jun. 1, 1982

[54] BATTERY COIL CONSTRUCTION

[75] Inventors: Singo Tsuda, Kadoma; Minoru Yamaga, Hirakata; Yuzuru Kawai, Kobe, all of Japan

[73] Assignee: Matsushita Electric Industrial Co., Ltd., Kadoma, Japan

[21] Appl. No.: 204,790

[22] Filed: Nov. 7, 1980

[30] Foreign Application Priority Data

Nov. 7, 1979 [JP] Japan .................. 54-144596

[51] Int. Cl.³ .............................................. H01M 4/00
[52] U.S. Cl. .................................... 429/94; 429/122; 429/161
[58] Field of Search .......................... 429/94, 122, 161

[56] References Cited

U.S. PATENT DOCUMENTS 3,650,842  3/1972  Bougaran ........................ 429/94
4,053,687  10/1977  Coibion et al. ..................... 429/94

Primary Examiner—Charles F. Lefevour
Attorney, Agent, or Firm—Wenderoth, Lind & Ponack

[57] ABSTRACT

An electrochemical cell utilizes a coil assembly formed by spirally winding negative and positive plates together with at least one separator therebetween. Each of the positive and negative plates is constituted by a main portion containing battery active material and an edge portion free of the active material. In the coil assembly, the edge portions of the respective plates protrude outwardly beyond the opposite edges of the separator and positioned on respective sides of the coil assembly. Positive and negative current collectors are made of a holeless nickel-plated steel sheet and welded to the edge portions of the respective plates by means of a plurality of welds.

3 Claims, 9 Drawing Figures

BATTERY COIL CONSTRUCTION

The present invention generally relates to an electrochemical cell such as nickel-cadmium cell, nickel-zinc cell, silver-zinc cell and lead-oxide cell, and, more particularly, to a battery construction in which a negative plate and a positive plate, with at least one separator positioned therebetween, are wound into a coil.

An electrochemical cell utilizing the above described coil assembly is well known and is disclosed in, for example, U.S. Pat. Nos. 3,695,935, 3,732,124 and 3,960,603 which are patented Oct. 3, 1972, May 8, 1973 and June 1, 1976, respectively.

In general, with reference to FIG. 6 of the accompanying drawings, the conventional electrochemical cell utilizing the coil assembly comprises two-component casing 10 including a container 10a and a lid or cap 10b tightly closing the opening of the container 10a with the coil assembly 11 housed therein together with an electrolytic solution. The coil assembly 11 is formed by spirally winding a layered structure of positive and negative plates 12 and 13 with a separator 14 situated therebetween. With the coil assembly 11 housed within the casing 10 as shown, the positive plate 12 is electrically connected to the lid 10a through an electroconductive, sealing disc 15 by way of an elongated connector 16 while the negative plate 13 is electrically connected to the bottom of the container 10a through an elongated connector 17.

In the construction shown in FIG. 6, each of the elongated connectors 16 and 17 has one end welded to the lid 10b or the bottom of the container 10a and the other end welded to or formed integrally with the corresponding positive or negative plate 12 or 13.

In the conventional electrochemical cell of the construction described with reference to and shown in FIG. 6, since each connector 16 or 17 and the corresponding positive or negative plate 12 or 13 is connected in a substantially pin-point contact fashion, a relatively large voltage drop occurs during discharge under high load, thereby reducing the battery output power. In order to avoid the large voltage drop inherent in the battery construction shown in FIG. 6, the above listed United States Patents disclose an improved version of the electrochemical cell, a common structural feature of which is shown in FIG. 7 of the accompanying drawings.

Referring now to FIG. 7, the positive and negative plates 12 and 13, with the separator 14 therebetween, are spirally wound to form the coil assembly 11 as is the case with the construction shown in FIG. 6, but the positive and negative plates are longitudinally offset from each other and also from the separator 14, leaving respective edge portions 12a and 13a of the positive and negative plates 12 and 13 one on each end of the coil assembly 11, which edge portions 12a and 13a of the respective positive and negative plates 12 and 13 are kept free of the battery active materials. In addition, in order to connect the edge portions 12a and 13a of the positive and negative plates 12 and 13 electrically to the lid 10b and the container 10a, a current collector member is utilized for each of the edge portions 12a and 13a of the respective positive and negative plates 12 and 13, two types of current collector member being shown respectively in FIGS. 8 and 9, while the current collector members associated respectively with the positive and negative plates 12 and 13 are identified respectively by 18 and 19 in FIG. 6.

In any event, each of the current collector members 18 and 19 has a tab 18a or 19a formed integrally therewith and mounted on, and welded to, the corresponding edge portion 12a or 13a by a plurality of welds while the free end of the tab 18a or 19b is also welded to the electroconductive, sealing disc 15 or the bottom of the container 10a.

Where the current collector member of the construction shown in FIG. 8 and as disclosed substantially in any one of the U.S. Pat. Nos. 3,695,935 and 3,732,124, is utilized, since the current collector member shown therein is of a generally U-shaped configuration and has a pair of arms 18b or 19b in addition to the tab 18a or 19a, a disadvantage is involved in welding the current collector member 18 or 19 to the corresponding edge portion 12a or 13a of the positive or negative plate 12 or 13. More specifically, during the welding effected to connect the current collector member to the corresponding edge portion 12a or 13a, a welding current (i.e., reactive current), tends to flow along the surface of the U-shaped body of the current collector member in a larger amount than from the current collector member to the corresponding edge portion 12a or 13a. Accordingly, even though the current collector member is pressed against the corresponding edge portion 12a or 13a by the application of an external pressure during the welding, the resultant weld joint still lacks a sufficient physical strength and, accordingly, the current collector member tends to separate easily from the corresponding edge portion 12a or 13a under the influence of vibrations and/or an external pulling force.

In addition, because of the particular shape of the current collector member, the manufacture thereof is somewhat complicated, resulting in an increased cost thereof.

The current collector member of the construction shown in FIG. 9 is disclosed in the U.S. Pat. No. 3,960,603 and is composed of a perforated, thin flexible metal plate having a plurality of projections, for example, a lath plate, a wire-netting or a punched metal plate. Where the current collector member of the construction shown in FIG. 9 is employed, a series spot welding process wherein at least two welding spots form at least one closed circuit is utilized to connect it to the corresponding edge portion 12a or 13a. The employment of the series spot welding process in combination with the perforated and irregularly surface-finished current collector member is advantageous in that the reactive current during the welding can be minimized and, accordingly, a relatively strong weld joint, as compared with the case where the current collector member of the construction shown in FIG. 8 is employed, can be obtained. However, because each weld joint is in practice formed between the tip of the projection on the surface of the perforated current collector member and the corresponding edge portion 12a or 13a of the respective positive or negative plate 12 or 13, the physical strength afforded by the total weld joints is still insufficient as compared with the optimum value.

In addition, the lath plate, the wire netting or the punched metal plate for the current collector member is relatively expensive and, accordingly, the manufacture of the electrochemical cell using it as the current collector members 18 and 19 is costly.

Accordingly, the present invention has been developed with a view to substantially eliminating the above described disadvantages and inconveniences inherent in the prior art battery coil constructions and has for its essential object to provide an improved battery coil construction which is durable in strength, stable in performance, less susceptible to voltage drop during discharge under high load, and low in cost.

In order to accomplish this and other objects of the present invention, the present invention makes use of positive and negative current collectors of different configuration for connecting the edge portions of the associated, positive and negative plates to the lid and the bottom of the container, said lid and container forming positive and negative terminals of the electrochemical cell. The positive current collector is constituted by a generally ring-shaped holeless body and an elongated tab outwardly protruding from the outer periphery of the ring-shaped body for connecting the the latter to the lid while the negative current collector is constituted by a holeless disc body having a centrally located tongue for connecting the disc body to the bottom of the container, said tongue being formed by means of pressing so as to protrude from the plane of any one of the opposite surfaces of the disc body leaving the opening of a shape complemental to the shape of the tongue.

In addition to the employment of the particular current collectors, the present invention utilizes a welding technique wherein the reactive current is positively utilized in contrast to the method wherein the reactive current is desired to be minimized such as in the above listed U.S. patents.

These and other objects and features of the present invention will become apparent from the following description taken in conjunction with a preferred embodiment thereof with reference to the accompanying drawings, in which.

Figure 1:
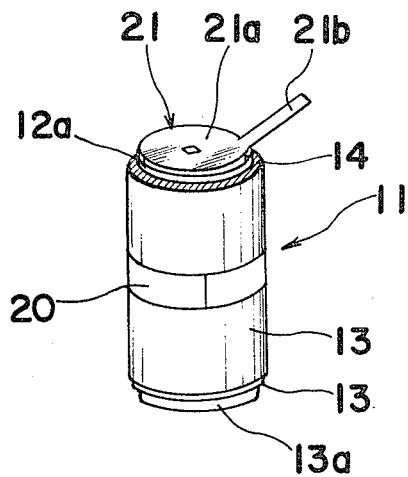
FIG. 1 is a perspective view of a coil assembly embodying the present invention.

Before the description of the present invention proceeds, it is to be noted that like parts are designated by like reference numerals throughout the accompanying drawings. It is also to be noted that, for the sake of facilitating a better and ready understanding of the present invention, a nickel-cadmium cell will be taken as an example to which the concept of the present invention is applied.

In the case of the nickel-cadmium cell or battery, the sintered positive plate 12 has a thickness of about 0.7 mm., whereas the pasted negative plate 13 has a thickness of about 0.6 mm. A respective active material is deposited on the corresponding metal substrate over the entire length thereof except for one edge portion which is left free of the respective active material, so that the edge portions 12a and 13a of the positive and negative plates 12 and 13 can be formed at the opposite ends of the coil assembly 11 when the latter is formed by spirally winding the positive and negative plates 12 and 13 with the separator 14 positioned therebetween. After the positive and negative plates 12 and 13 with the separator 14 have been spirally wound in the manner described above, a length of adhesive tape is applied at 20 to secure the respective outer ends of the plates 12 and 13 and separator 14 in position as shown in FIG. 1, which adhesive tape 20 must have a resistance to alkaline electrolyte.

Figure 7:
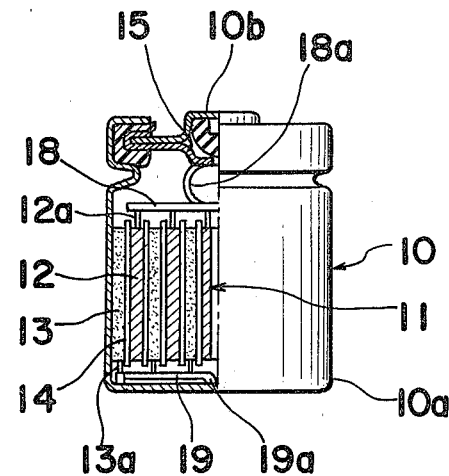

The coil assembly 11 so far described and employed in the present invention is substantially identical with that described with reference to and shown in FIG. 7.

Figure 3:
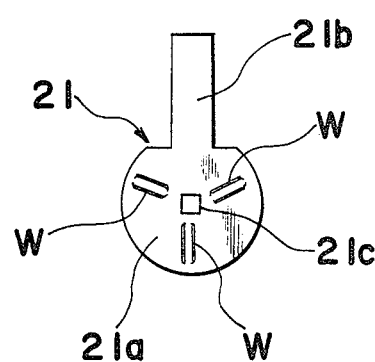
FIGS. 3 and 4 are top plan view, respectively, of positive and negative current collectors employed in the present invention, traces of weld being also shown.
Figure 4:
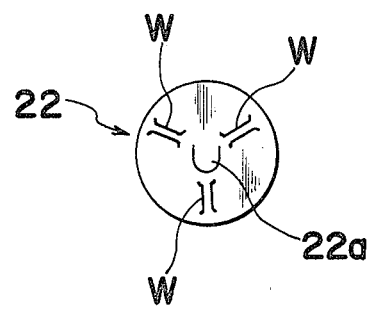

However, in accordance with the present invention, unique positive and negative current collectors are employed, which are best shown in FIGS. 3 and 4, respectively.

Referring to FIG. 3, the positive current collector identified by 21 is made of a holeless nickel-plated steel sheet, 0.2 mm. in thickness, and is of a generally keyhole shape comprised of a generally ring-shaped holeless body 21a and an elongated tab 21b extending radially outwardly from the outer periphery of the ring-shaped body 21a. The generally ring-shaped body 21a of the positive current collector 21 has a centrally located opening 21c defined therein, which opening 21c enables the electrolyte to be injected into the coil assembly 11.

Figure 5:
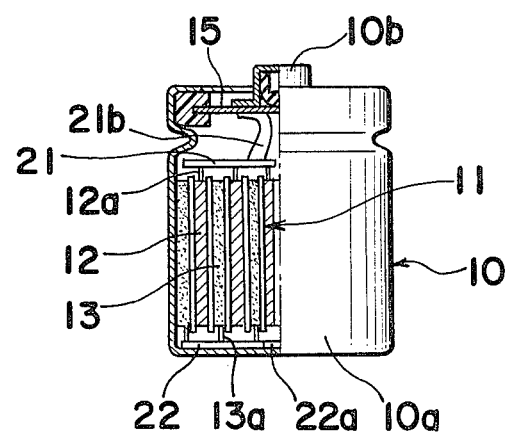
FIG. 5 is a side elevational view, with a portion shown in section, of an electrochemical cell incorporating the battery coil assembly according to the present invention.
Figure 6:
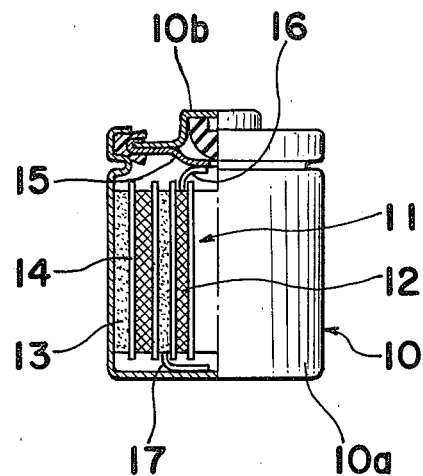
FIGS. 6 and 7 are views similar to FIG. 5, showing the prior art electrochemical cells.

Referring now to FIG. 5, after the positive current collector 21 has been mounted on and subsequently welded to the edge portion 12a of the positive plate 12 in a manner as will be described later, the elongated tab 21b of the positive current collector 21 is folded inwardly of the generally ring-shaped body 21a and then welded in any known manner to the electroconductive, sealing disc 15 which is held in contact with the lid 10b serving as a positive electrode.

Referring to FIG. 4, the negative current collector identified by 22 is made of a holeless nickel-plated steel sheet, 0.2 mm. in thickness, and is of a circular shape comprised of a generally holeless disc body having a centrally located tongue 22a formed by subjecting the circular collector 22 to pressing, said tongue 22a protruding outwardly from the plane of one surface of the circular collector 22 while leaving a complemental opening in the circular collector 22. The tongue 22a in the negative current collector 22 serves to ensure a rigid connection between the negative current collector 22 and the bottom of the container 10a which may be effected by the use of any known welding technique as shown in FIG. 5, it being to be noted that the connection between the tongue 22a and the bottom of the container 10a is to be effected after the negative current collector 22 has been welded in a manner as will be described later to the edge portion 13a of the negative plate 13.

Hereinafter, the welding of the positive and negative current collectors 21 and 22 to the respective edge portions 12a and 13a of the positive and negative plates 12 and 13 will be described. However, since the positive and negative current collectors 21 and 22 are, according to the present invention, welded in the same manner, only the welding of the positive current collector 21 to the edge portion of the positive plate 12 will be described for the sake of brevity with particular reference to FIG. 2.

Figure 2:
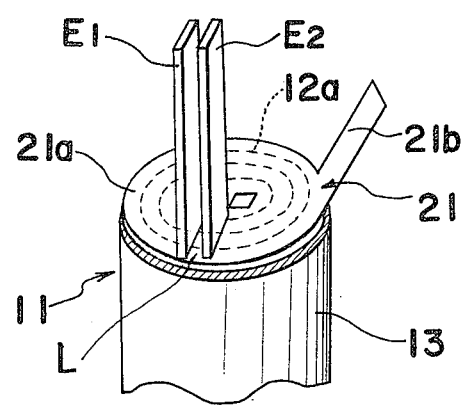
FIG. 2 is a perspective view, on a somewhat enlarged scale, of one end of the coil assembly showing how a pair of welding electrodes are applied to a positive current collector.

As shown in FIG. 2, after the positive current collector 21 has been mounted on the edge portion 12a of the positive plate 12, a pair of welding electrodes E1 and E2 spaced a distance of 2 mm. from each other are held in contact with the positive current collector 21 and, then, by using an alternating current welding machine, an A.C. welding current of 1 kA on an average with 5 volts is supplied to the electrodes E1 and E2 for a period of time corresponding to 4 cycles of the applied current. When the welding current is so applied, a portion of the generally circular body 21a of the positive current collector 21 which is bound by the pair of welding electrodes E1 and E2 is heated to a red-hot state which in turn heats the edge portion 12a of the positive plate 12, which is located underneath said portion of the generally ring-shaped body 21a of the positive current collector 21, to a red-hot state. Accordingly, that portion of the generally ring-shaped body 21a of the positive current collector 21 is fused to unite together with the edge portion 12a of the positive plate 12. In this way, a welding connection is formed between the generally ring-shaped body 21a of the positive current collector 21 and the edge portion 12a of the positive plate 12. The welding is effected at a plurality of, for example, 2 to 4, locations on the generally ring-shaped body 21a of the positive current collector 21, which welding locations should be equally spaced from each other in the circumferential direction of the generally ring-shaped body 21a of the positive current collector 21. So far illustrated in FIG. 3 (and so far illustrated in FIG. 4 in the case of the negative current collector 22), the positive current collector 21 is shown as having three welds W formed on the generally ring-shaped body 21a, each adjacent two welds W being spaced 120° from each other. It is to be noted that, since the purpose of welding is to rigidly connect the generally ring-shaped body 21a of the positive current collector 21 to some of the spiral turns of the edge portion 12a of the positive plate 12, the welding should be effected in such a manner that each resultant weld W extends over said some of the turns on the edge portion 12a in a radial direction of the generally ring-shaped body 21a without crossing the outer and inner peripheral edges of the generally ring-shaped body 21a. It is also to be noted that, when the welding is effected in the manner as hereinbefore described with the use of the spaced welding electrodes E1 and E2, that portion of the generally ring-shaped body 21a of the positive current collector 21 which has been heated to the red-hot state may melt down to form a "fusion hole". Even though this fusion hole should be formed, it causes no adverse influence on the physical strength of the resultant weld because the metal so fused leaving the fusion hole in the generally ring-shaped body 21a has been used to enhance a rigid connection between the generally ring-shaped body 21a of the positive current collector 21 and some turns of the edge portion 12a of the positive plate 12.

The negative current collector 22 is, either after or simultaneously with the welding of the positive current collector 21 to the edge portion 12a of the positive plate 12, welded to the edge portion 13a of the negative plate 13 in the same manner as hereinbefore described. The resultant coil assembly 11 with the positive and negative current collectors 21 and 22 positioned respectively on the opposite ends thereof is thereafter inserted into the container 10a of the battery casing 10, the tab 21b and the tongue 22a being subsequently welded respectively to the sealing disc 15 and the bottom of the container 10a in any known manner. The lid 10b is mounted on the container 10a to hermetically close the opening of the container 10a with the coil assembly 11 therein, after the electrolyte is injected into the container in any known manner, thereby completing the assembly of the electrochemical cell as shown in FIG. 5.

Figure 8:
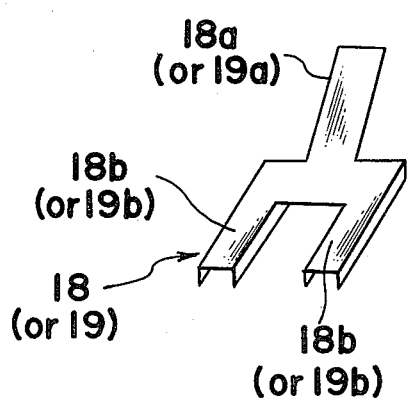
FIGS. 8 and 9 are perspective views, on a somewhat enlarged scale, showing different current collector members employed in the prior art electrochemical cells.
Figure 9:
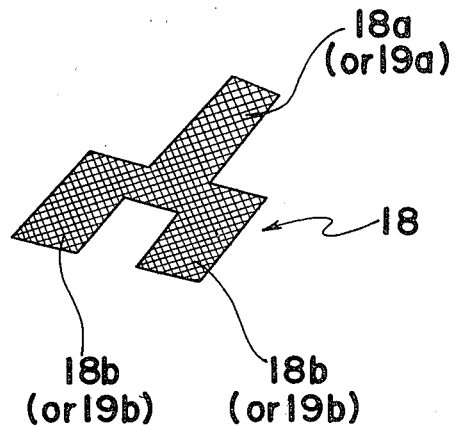

The inventors of the present invention have conducted a series of comparative tests to determine, evaluate and compare a group of 50 samples of the electrochemical cells manufactured according to the present invention with a first control group of 50 samples of the electrochemical cells utilizing the positive and negative current collectors of the construction shown in FIG. 8 and a second control group of 50 samples of the electrochemical cells utilizing the positive and negative current collectors of the construction shown in FIG. 9, all of the samples tested being designated No. KR 23/43 according to the IEC standards (or K60 according to the ANSI standards or GSZ 1.2F according to the DIN standards) and having a rated capacity of 1.2 Ah. The results of the tests are tabulated below.

| | Physical Strength | | Battery Characteristics | |
| --- | --- | --- | --- | --- |
| | Tensile Strength (kg) | No. of Samples with Current Collectors Separated under Vibration | Cycle Test (Number of Samples Rejected) | Large Current Discharge Characteristics |
| | | | | Capacity / Average Discharge Voltage |
| Invention | 10 to 13 | 0 | 0 | 1.00Ah / 1.110v |
| First Control Group (FIG. 8) | 2 to 6 | 3 | 1 | 0.85Ah / 1.065v |
| Second Control Group (FIG. 9) | 5 to 9 | 1 | 1 | 0.93Ah / 1.100v |

During the test, the tensile strength was measured by the use of a Token Push Pull Gauge, Type TVE 101. In determining the number of samples in which the current collectors were separated from the corresponding coil assemblies, mechanical vibrations of 4 mm. in amplitude and 100 cycles per minute in frequency were applied to each electrochemical cell while the latter was held in three ways, namely, with the lid or positive electrode facing upwards, downwards and laterally. The time during which the vibrations were applied while the cell was held in each of the ways was 20 minutes.

The number of samples wherein electric shortcircuitting occurred and which are, therefore, rejected is listed in the entry "Cycle Test". Whether or not the shortcircuitting occurred were determined by testing each sample for 300 cycles under the temperature of 20° C., each cycle consisting of charging for 7 hours at 1/5 C. and discharging at 1 C. to 1.0 volt.

During the measurement of the large current discharge characteristics, each sample was charged at 1/5 C. for 7 hours and discharged at 10A under the temperature of 20° C.

From the foregoing and as can readily be understood from the above table, the welding method employed in the practice of the present invention is such as to make use of the reactive current, in contrast to the conventionally employed method wherein the reactive current is desired to be minimized. According to the present invention, by the utilization of the reactive current, the area to be welded is instantaneously heated to the red-hot state to achieve the fusion-bonding and, accordingly, a more rigid weld connection can be attained than the conventionally employed method which requires the application of the welding electrodes to the current collector under pressure in order to minimize the reactive current with the contact pressure between the current collector and the edge portion of the corresponding positive or negative plate consequently minimized. Specifically, in the present invention, the welding electrodes E1 and E2 need not be pressed against the current collector because of the reactive current being positively utilized.

For the practice of the method according to the present invention, the A.C. welding machine, rather than the capacitor discharge welding machine, is employed advantageously and, with it, the welding operation can be effected for a very short period of time corresponding to a few cycles of the applied current.

It is to be noted that, if the welding electrodes E1 and E2 are spaced a distance L within the range of 1 to 5 mm., the welding operation can be carried out satisfactorily. If the distance L is larger than 5 mm., the heat capacity at that portion of the current collector bound by the electrodes E1 and E2 tends to become large to such an extent and, therefore, the application of a given welding current will fail to heat that portion of the current collector to the red-hot state. This means that no sufficiently rigid weld connection can be obtained between the current collector and the edge portion of the corresponding positive or negative plate. In such case, the increased welding current will result in heating of that portion of the current collector to the red-hot state, but that portion of the current collector being welded tends to evolve a relatively large amount of heat to such an extent as to burn an edge portion of the separator positioned between the positive and negative plates, the burning of the edge portion of the separator resulting ultimately in the undesirable shortcircuitting between the positive and negative plates. Even if the welding operation is successful with the application of the increased welding current while the electrodes E1 and E2 are spaced a distance larger than 5 mm., no sufficient concentration of heat on the portion of the current collector to be welded can be achieved and, accordingly, the resultant weld tends to be fragile.

The thickness of the current collector is also one of factors that affect the welding efficiency. However, according to the present invention, where each of the positive and negative current collectors 21 and 22 is made of nickel or nickel-plated steel, the current collector having a thickness up to 0.5 mm. can be employed satisfactorily. If the thickness is larger than 0.5 mm., the red-hot state can hardly be established at that portion of the current collector bound by the welding electrodes because of the reduced electric resistance and also of the increased heat capacity. In addition, the larger the thickness of the current collector, the more rigid the current collector, and accordingly, there is difficulty in welding the portion of the current collector to each turn of the edge portion of the corresponding positive or negative plate. Although this possibility can be avoided if the current collector of the increased thickness is pressed against the edge portion of the corresponding positive or negative plate by the application of a pressure during the welding operation, the application of the pressure will adversely results in fall-down or folding of some of the turns of the edge portion of the corresponding positive or negative plate, which falldown brings about shortcircuiting between one turn of the edge portion of the positive plate and the adjacent turn of the edge portion of the negative plate.

Furthermore, in the practice of the present invention, each of the positive and negative current collectors employed is simpler in construction and less expensive than that shown in any one of FIGS. 8 and 9 and, accordingly, the present invention is effective to provide the improved electrochemical cell.

Although the present invention has fully been described in connection with the preferred embodiment thereof with reference to the accompanying drawings, it is to be noted that various changes and modifications will be apparent to those skilled in the art. By way of example, each of the edge portions of the respective positive and negative plates employed in the present invention may be ruffled or corrugated such as disclosed in the U.S. Pat. No. 3,695,935.

In addition, each of the positive and negative current collectors may be corrugated, ruffled or embossed, although the flat current collector such as shown in any one of FIGS. 3 and 4 is preferred.

Accordingly, such changes and modifications are to be included within the true scope of the present invention unless they depart therefrom.

We claim:

1. A battery coil construction comprising a positive plate having a main portion containing active material and an edge portion free of said active material, a negative plate having a main portion containing active material and an edge portion free of said active material, at least one separator, said positive and negative plates being wound together to form a coil assembly with said separator positioned between the positive and negative plates, said positive and negative plates being longitudinally offset from each other so that said edge portion of one plate extends outwardly from the other edge portion of the other plate and also the separator while said edge portion of the other plate extends outwardly from the other edge portion of said one plate, a positive current collector constituted by a generally ring-shaped holeless body and an elongated tab extending outwardly from the outer periphery of said ring-shaped body, and a negative current collector constituted by a holeless disc body having a centrally located tongue protruding outwards from the plane of one surface of said disc body, said ring-shaped body and disc body of the respective positive and negative current collectors being welded to the edges portions of the respective positive and negative plates by a plurality of welds, each of said welds being formed by applying a welding current through a pair of spaced welding electrodes to a portion of the current collector to heat it to a red-hot state thereby to fusion-bond said body to a plurality of turns of the edge portion of the respective plate.

2. A battery coil construction as claimed in claim 1, wherein each of the welds on the positive current collector extends in a radial direction of the generally circular body with its opposite ends positioned inwardly adjacent to the inner and outer peripheral edges of said circular body, respectively.

3. A battery coil construction as claimed in claim 1 or 2, wherein each of the welds on the negative current collector extends in a radial direction of the disc body with its opposite ends positioned inwardly adjacent to the outer peripheral edge of said disc body and tongue, respectively.

* * * * *